May 13, 1941.  E. B. HESSER  2,241,402
ART OF COLOR PHOTOGRAPHY
Filed Dec. 22, 1938   3 Sheets-Sheet 1

INVENTOR.
Edwin Bower Hesser,
BY
ATTORNEY.

May 13, 1941.  E. B. HESSER  2,241,402
ART OF COLOR PHOTOGRAPHY
Filed Dec. 22, 1938   3 Sheets-Sheet 3

Fig. 32
BLUE-GREEN
BI-PACK

Fig. 33
BRICK-RED
NEGATIVES

Fig. 34
GREY-BLACK PRINT
FROM BLUE-GREEN
NEGATIVE TINTED
YELLOW

Fig. 35
BRICK-RED
FILM

Fig. 36
BLUE-GREEN
FILM

Fig. 37
RED NEGATIVE

Fig. 38
BLUE-NEGATIVE

Fig. 39
WHITE BACKING
TINTED YELLOW

Fig. 40
RED FILM

Fig. 41
BLUE FILM

Fig. 42
BACKING TINTED
YELLOW

Fig. 43
RED-FILM

Fig. 44
BLUE FILM

Fig. 45
PANCHROMATIC FILM
CELLOPHANE
FILM

Fig. 46

INVENTOR.
Edwin Bower Hesser,
BY Richard Spencer
ATTORNEY.

Patented May 13, 1941

2,241,402

UNITED STATES PATENT OFFICE 2,241,402

ART OF COLOR PHOTOGRAPHY

Edwin Bower Hesser, West Hollywood, Calif., assignor to Naturalcolor Corporation, West Hollywood, Calif., a corporation of Illinois Application December 22, 1938, Serial No. 247,291

18 Claims. (Cl. 95—2)

This invention relates to photography and has for its general object to provide a simple and inexpensive process or method for making various products, particularly positive prints on paper in color from color-separation photographic negatives, the resultant prints being less exaggerated and artificial than the previously known color productions resulting in more natural prints, fast to light and of a brilliant, glossy finish especially suited to commercial printing reproduction.

This application is a continuation-in-part of my copending application Serial No. 741,033, filed August 23, 1934, and of my copending application Serial No. 115,759, filed December 14, 1936.

The employment of the invention results in the production of paper prints and other types of prints including transparencies, utilizing four colors as a standard in true natural color work but effective in various other combinations with as few as two printings in color, or as many as seven.

Heretofore practically all color photography has utilized only three color-separation sets for printing in yellow, red and blue. The preferred process of the present invention employs a series of four color-separation negatives, a fourth printing color, black, being added. The addition of the fourth color, black, in which it is to be understood are included its various gradations through shades of gray towards white, has marked advantages over three-color photography in adding depth of tone and perfection of definition. It is further to be understood, however, that various features of the invention may be utilized without the employment of the black printing, particularly in three-color and two-color printing, as hereinafter explained.

The prints resulting from the employment of the invention embody pure, unclouded whites and true blacks with accurate rendition of all other colors of the spectrum. They are clear and sharply defined without artificial predominance of any particular color. Furthermore, in previous commercial color printing great difficulties have been encountered in production due to the fragility of materials employed and the necessity of air-conditioning to a fixed or limited temperature with the further disadvantage of large consumption of time so that strictly laboratory conditions with refrigerated air were needed for the best results. By the present invention a complete color print can be made from a set of previously prepared negatives in less than half an hour with no elaborate apparatus and under climatic conditions ranging from tropical to polar. This speed and simplicity of production make the invention of special value from a military standpoint such as in map making in which the natural colors of the terrain photographed would be visible in aerially made negatives.

Such practical advantages result from the facts that no exceedingly fragile elements or expensive apparatus are employed and defects in the negatives do not materially affect the final result, that is, whether one or more of the negatives are weak and under exposed or heavy and over exposed, a satisfactory color print can be produced by the present invention due to the ease with which original negative making errors may be corrected.

To the above and other ends, which will be hereinafter made clear, the invention consists in the features, methods, articles, chemical solutions, products and devices hereinafter described and particularly pointed out in the claims.

The invention will be more particularly described in connection with the accompanying drawings which have been made to give a pictorial representation of steps of various processes involved as well as of devices employed therein and resultant products.

In the drawings,

Figure 14 is a perspective view of the finished black film suitably backed-up and mounted;

Figures 15 through 23 relate to the production of the yellow, blue and red films which are to be superimposed on the black or gray-black films;

Figure 20 is a fragmentary side elevation showing the relations of the superimposed films on the backed-up gray-black print;

Figure 30A is a modified arrangement in which Cellophane sheets each bearing images in one of the colors yellow, magenta and blue with an added key print in black or brown are superimposed on a sheet of plain white paper and a corresponding number of plain Cellophane sheets are superimposed on the opposite side;

Figure 31 is a face view corresponding to Figure 29;

Referring to the drawings in detail, Figures 1-4 illustrate respectively the black negative, the yellow negative, the red negative and the blue negative employed in the four-color process, these negatives being respectively numbered, 10, 11, 12 and 13. It will be observed that these are provided each with an identifying mark at the lower left-hand corner. For the sake of simplicity the pictures taken on these negatives are indicated by circles marked respectively 14, 15, 16 and 17, the diameters being varied merely for clearness of illustration. As to the so-called black negative 10, as has been explained, the term "black" comprehends the various gradations of grays to white. This negative will produce a print which will vary in shades of gray, and although the same may be hereinafter referred to as a black recording negative or print, the same shall be understood to include a negative or print in varying shades of gray.

In producing the negatives, suitable color filters for gray-black printing, yellow, red and blue printings are made use of to produce the color-separation series.

Figure 5:
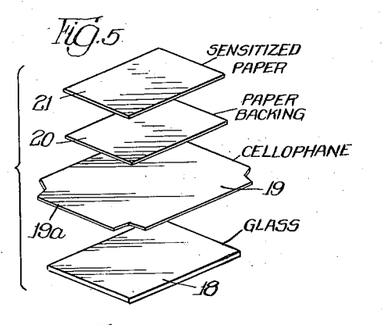
Figure 5 is an exploded view showing the elements used in the preparation of a basic or black film.
Figure 6:
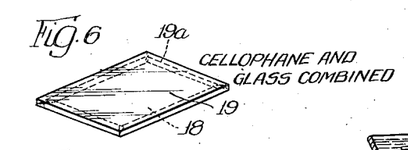
Figures 6 to 8 illustrate steps in the production of an article hereinafter termed a backed-up blank.

Referring now to Figure 5, this shows the elements used in the preparation of the black printing, sensitized photographic paper backed up, 18 indicating a plate of glass or other material suitable to provide a rigid mounting, 19 indicating a sheet of comparatively thick Cellophane or multiple sheets of thinner Cellophane with the corner portions removed along obtuse angles suitably cut to overlap the element 18 without overlapping each other, 20 indicating a sheet of unsensitized photographic backing paper, and 21 indicating a sheet of sensitized photographic paper such as "Eastman Azo" that may be obtained on the open market. The supporting element 18 is required to be rigid, acid-proof and water-proof. The thick or heavy Cellophane sheet 19 is stretched thereover and cemented only on its overlapping edge portions 19a fold over and are sealed to the back of the plate 18 (Figure 6), the steps of the operation in which the sensitized paper is handled being performed in the dark.

Instead of using a thick or heavy sheet of Cellophane, it is often preferable to use a plurality of thinner sheets of Cellophane corresponding in number, size and thickness to the color films of Cellophane and other Cellophane sheets subsequently superimposed on the front of paper mounting, as hereinafter more fully described. These Cellophane sheets serve to counterbalance the tendency of the paper backing to curl and at the same time give body to the photograph.

Figure 7:
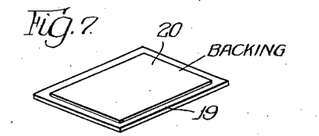
Figure 10:
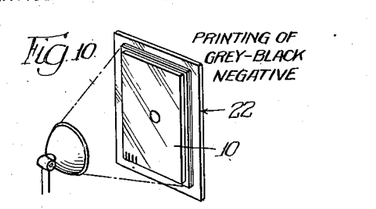
Figure 10 is a perspective view illustrating the printing of the black negative of Figure 1.
Figure 10A:
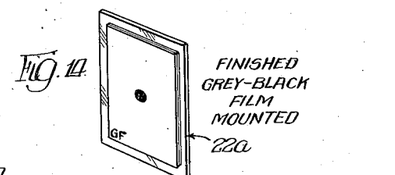
Figure 11:
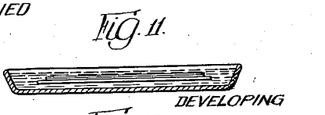
Figures 11, 12 and 13 illustrate graphically the developing, fixing and washing steps for the black film.
Figure 12:
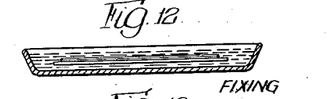
Figure 13:
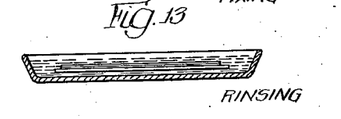

The unsensitized photographic backing paper is affixed to the combination of the rigid support 18 and its Cellophane covering 19. This is illustrated in Figure 7. The sensitized paper 21 is soaked in water in the dark prior to being affixed (Figure 8), in order to eliminate subsequent stretching which would cause misregistration with the colored film printed subsequently applied. The build-up as illustrated is firmly rolled or squeegeed so that it will attain its maximum stretch. The backed-up sensitized paper blank thus produced, as illustrated clearly in Figure 9 and designated as a whole by the numeral 22, is then dried in the dark and is ready for use. A print is made upon its sensitized surface by light printing through the black printing negative 10 as conventionally illustrated in Figure 10. Figures 11, 12 and 13 illustrate conventionally the respective operations of developing, fixing and washing the print, these views making it clear that these operations are carried out while the print remains attached to its backing 18, the whole build-up or combination 22 undergoing the operations aforesaid. As subsequently appears, these operations are preferably performed by swabbing rather than by immersion, the latter, however, rendering itself better to graphic representation of the steps. When dried in the usual forced air box, this print with associate parts designated as 22a (Figure 14) becomes ready for the next step in the process, that is, for the addition of the next color. The combination or composite element 22a is in effect a gray-toned, black and white photograph with rigid mounting, differing only from the usual photograph in this respect and in the degree of filtration used in its making which causes only the outline-shadows to be recorded, without color, the colors of course being supplied by the subsequently added series of films by the succeeding steps of the process.

Figures 9, 9A:
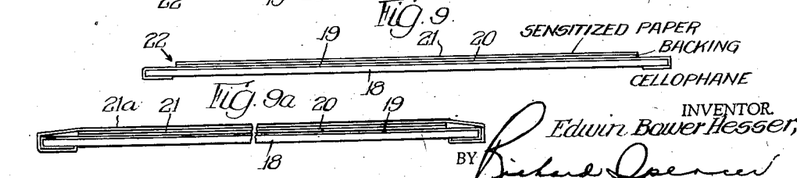
Figures 9 and 9A are side elevations of the backed-up blank aforesaid and a variation thereof.

Before taking up this second step certain practical features involved in the preceding step may be profitably adverted to more at length. In manufacturing the backings the glass 18 or other selected supporting plate is first thoroughly cleaned. For a standard eight by ten inch picture, the rigid support 18 should be nine by eleven inches. The Cellophane 19, or kindred material, is then cut to size twelve by fourteen inches, the size to vary according to convenience. Immerse this Cellophane for three minutes in an aqueous solution of acetic acid, from ½% to 3%, for the purpose of hindering bacterial, mildew or fungi growths. Then center this piece of Cellophane 19 over the glass 18. The corners are now clipped to give an octagonal shape. They can be clipped in advance, by definite pattern, greatly facilitating this operation. Press out all moisture between Cellophane covering and the rigid support, eliminating all bubbles. A margin of Cellophane will project over all sides of the rigid support. On the lower surface of this Cellophane adhesive cement should be applied, the Cellophane then turned back over the rigid support and allowed to adhere. One or more sheets, similarly applied, may be used. A sheet of eight by ten inch unsensitized photographic paper, as 20, is now cemented over the center of the support, firmly pressed to make smooth. The whole combination should now be thoroughly dried before application of the sensitized paper 21 for use in four-color printing. There is a tendency of photographic paper to enlarge and stretch during the ordinary printing, developing and fixing operations. In an ordinary paper, size eight by ten inches, the "stretch" often equals a fourth of an inch. This is sufficient to entirely ruin attempts at registration of color films made from the same set of negatives. In order to correct this difficulty, it was found to be necessary to insure against the stretching of paper in this color printing process, inasmuch as the gray-black print, the only one printed on paper, is the basis and support for all the color films which are in themselves transparent as to base, carrying the pictures, in color, only as indicated in the separation negatives. This method, used in preparation of the finished backing 22a, protects the photographic paper from stretching after the image is placed upon it by exposure to the negative. The effect of this method of treatment is that the paper becomes "pre-stretched," eliminating further distortion of the image thereon. The addition of the sensitized paper 21, while necessary to make the backing complete, is usually inadvisable until shortly before the actual use of the combination in making the black print as support for the rest of the picture. The backing, plus the sensitized paper, is much more difficult to handle than when it is plain, and the following operation can as easily be carried out just prior to use. The method of procedure as heretofore described, including the drying of the Cellophane and unsensitized paper on the rigid support, produces the complete backing 22 except for the sheet 21.

The dry backing is next taken into a photographic dark room, illuminated only by ruby light. Cement adhesive is made ready for use, a tray of pure, clean water is provided, and into this is placed, for two minutes, a sheet of eight by ten inch glossy sensitized photographic paper 21. Any commercially known paper is satisfactory, but one with a high degree of contrast is recommended. When this paper is thoroughly wet, its sensitized side is placed face downward on a clear, clean piece of glass. This should be exactly the same size as the paper, and the paper should be manipulated to cover the glass evenly. Surplus water should be eliminated by a rubber wiper of soft texture. The cement adhesive is put evenly on the back of this paper, which is then raised from the glass, and put back down upon the backing which has already been prepared. Great care must be taken in attaching the cement adhesive covered sensitized paper 21 to the backing, to see that the adhesive touches only the back or non-sensitized surface of the photographic paper. If it touches the sensitized front side of the paper, it is rendered unfit for further use. The backing with sensitized paper attached (indicated at 22 in Figure 9) must be kept in "photographic darkness" until needed for printing. To insure against the sensitized photographic paper curling and leaving the glass, it is advisable to cover it with a piece of wet, light quality Cellophane 21a, as shown in Figure 10, cementing down the edges of the Cellophane on the back of the mounting, but not cutting off the corners, as directed in the making of the backing. Let these corners remain rough on the back of the backing. This will aid in taking off this protective covering, when the proper time comes in the progress of making color prints.

The printing operation of the black print conventionally illustrated in Figure 10 is a photographic operation carried out in an ordinary dark room, preferably on a contact printing machine of suitable type. The plate 22a (Figure 14) thus produced preferably has the developing solution applied to it by a swab or sponge. To arrest development the print is swabbed with a solution of acetic acid, glacial, ½ ounce, and 8 ounces of water. Next the print is fixed by swabbing rather than by immersion with an ordinary solution of sodium hyposulphite for about two minutes and then washed and tested with a dilute solution of potassium permanganate. When found ready it is put in the drier.

In some cases the black key print may be omitted, in which event the sensitized paper 21 may be replaced by a plain sheet of Cellophane over paper backing 20. Alternatively, the key print may be made on Cellophane instead of sensitized paper.

Figures 15, 16, 17, 18, 19, 20, 21, 22, 23:
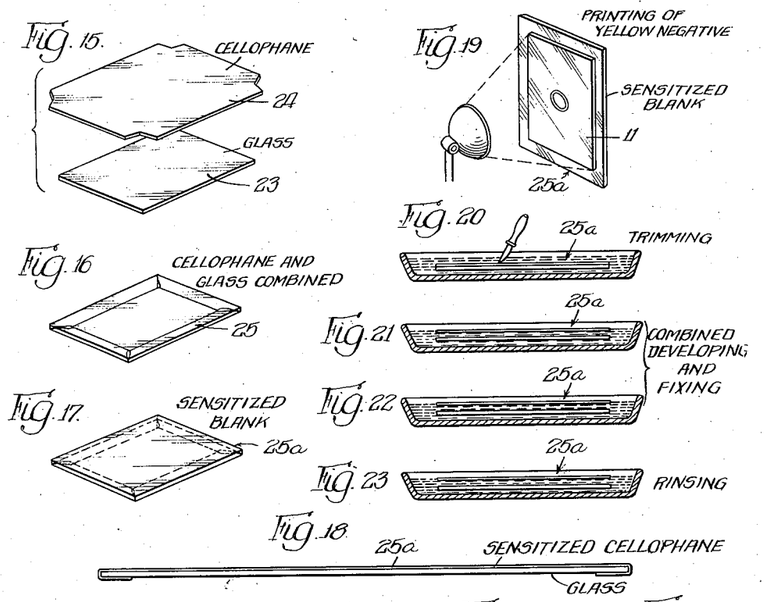
Figure 15 is an exploded view of the parts constituting an element hereinafter referred to as a blank.
Figure 16 illustrates the parts of Figure 15 combined.
Figure 17 illustrates the sensitized blank in perspective.
Figure 18 is a side elevation of a blank ready for use.
Figure 19 conventionally illustrates the printing of the blank.
Figures 20, 21, 22 and 23 illustrate successive steps resulting in the process of complete color films.

Referring now to the steps in the method for producing the colored films printed from the color-separation negatives 11, 12 and 13 (Figures 2-4), these are printed on elements termed blanks, the production of which is illustrated in Figures 15 to 18. Each blank comprises a plate or sheet 23 of glass or other suitable supporting material to which is applied a thin sheet 24 of Cellophane or other transparent material properly sized and cut out, the Cellophane sheet 24 being stretched and cemented on the glass to produce the complete blank 25 (Figure 16). It may be stated that plain water rather than an acetic acid solution is preferably used as an immersion bath before putting the Cellophane on its support as illustrated in said figure. To prepare the blank for printing in yellow, for example, a yellow dye sensitizer solution is quickly, lightly and evenly applied to the surface by manual or mechanical means resulting in the production of a sensitized yellow plate 25a (Figures 17 and 18). For the yellow film the Cellophane employed is of the thinnest non-moistureproof quality. It is stretched over the plate 23 while wet and after being cemented to the back thereof is allowed to dry. It will be understood that the blanks 25 are substantially identical for all the colors used.

The dyes for each color are added to a stock solution for sensitizing the blanks to make them into color printing films. The dye used is preferably the azo group of acid aniline dyes in any desired color or shade of color. The sensitizing solution employed is compounded best just before using, in ordinary manufacturing usage, though these dyes may also be prepared in advance, and bottled ready for use, as an article of manufacture in connection with the process. When so bottled in advance, dye-preservative compounds must be added, but when made up for immediate use, the following formulae are correct. The amount of dye, sensitizing element of potassium dichromate or ammonium bichromate, is averaged. This may be varied according to practice, and the desire for deeper or lighter hues. One ounce of solution is generally sufficient to sensitize five plates or blanks, in the standard eight by ten inch size. For sensitizing:

| | |
|---|---|
| Distilled water__________________ounce__ | 1 |
| Citric acid crystals_______________grains__ | 2–10 |
| Acid dye of desired color_________do____ | 10–60 |
| Ammonium bichromate or potassium dichromate_______________________grains__ | 5–60 |

The density or strength of the color print, and its contrast of light and shade, is controllable by the individual operator by variations of the sensitizing solution within the limits specified. An orange dye, for instance, requires little citric acid and much less ammonium bichromate to print effectively than does a yellow dye, which requires the maximum of ammonium bichromate to print speedily. These elements are also variable in relation to the source of light to be used in printing, but the general procedure and the chemicals employed are not altered except as to proportion.

Employing small glasses or glass dishes, one for each color, the appropriate dye should be added to a suitable quantity of sensitizer solution in each dish, and mixed carefully in a dark room using separate glass stirring rods for the mixtures. To obtain the best practical results it is important to outline the sensitizing step somewhat in detail. Preferably a small piece of cotton, as a swab, is immersed in the sensitizing yellow solution and rubbed quickly and evenly over the blank, the Cellophane readily absorbing the solution. It is then dried off and any surplus removed. Thereafter it is well to polish down the surface with a cotton swab, leaving it free from lint. Plate 25a is now color-sensitized and should be placed in the dark room drier. Being sensitive to light it must be protected until ready for printing. The same operation is repeated for each of the other red and blue sensitized dyes. It is found in practice that one ounce of solution with dye added is sufficient to sensitize from 4 to 6 sheets of nine by eleven inch size. The sensitized films may be kept in darkness for several hours without losing efficiency. By the addition of chemical preservatives these sensitized blanks can be stored away for an indefinite time and used as desired. The blanks are thus sensitized for printing in desired colors each at a single operation.

Figure 1:
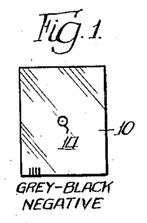
Figures 1 to 4 illustrate schematically in face view a set of four color-separation negatives employed in the standard four-color process or method of the invention.
Figure 2:
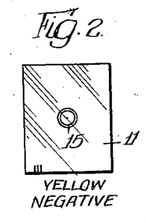
Figure 3:
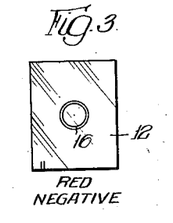
Figure 4:
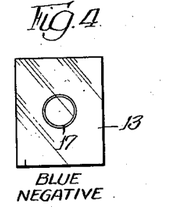

For printing, the yellow sensitized plate 25a is associated with the appropriate color-separation yellow negative, indicated at 11, Figure 2, in a darkened room and then exposed to sunlight or carbon arc light for a time sufficient to produce a film of desired density. The printing process is conventionally illustrated in Figure 19. In carrying out the printing process the yellow negative 11 is placed with its emulsion side in direct contact with the sensitized film, care being taken that they are both absolutely dry prior to contact. An ordinary contact printing frame may be employed for the purpose and exposed to light. From six to twelve minutes will suffice to print a negative depending on the density and light intensity. Thereafter the film should be immersed in running water for a minute or two and after being cut around the edges with a sharp blade to disconnect from its associate plate (Figure 20), it should be allowed to float to the top and then removed.

The next steps in the process involve the developing, fixing and washing of the printed film. The solutions employed for these steps will next be given. The standard solution for developing out the color films is compounded as follows:

| | |
|---|---|
| Water __________________gallon__ | 1 (128 ounces) |
| Acetic acid, glacial (or citric acid)____________________ounces__ | 4 |

The solution for final washing out of surplus color and fixation of wanted color in the films prior to superimposition in the print making process is identical, used as a final "wash," as in Figure 23. This wash should be clean solution for each film that is to be superimposed.

Inasmuch as a basic feature of the invention is the fact that certain mild acids employed in these formulae have a dual power of reducing the printed image on a color-sensitized Cellophane blank, as 25a, and then definitely fixing this image permanently in the Cellophane it is only necessary to provide a row or rows of trays for the combined reduction and fixation operations, the above specified solutions being placed therein. The printed film is placed in a succession of these trays as illustrated in Figures 21 to 23 for developing, fixing and washing.

Figure 24:
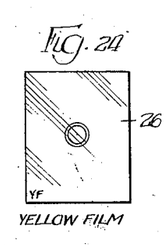
Figures 24, 25 and 26 illustrate complete the color films with their rigid backing removed.
Figure 25:
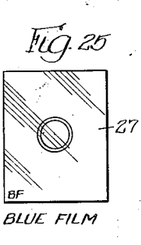
Figure 26:
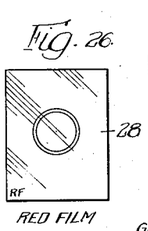

In Figures 21 and 22 the development and fixation steps are shown graphically as separate but as indicated on the drawings these steps in practice are combined into one, the mild acid solution having the dual property of developing and fixing the image in a single bath. It will be understood that the process is repeated for the red and blue films, the only difference being in the dyes employed. This applies equally to orange, green, purple and brown dyes. The yellow, blue and red films in completed state are illustrated in Figures 24 to 26, wherein they are designated respectively as 26, 27 and 28. The process provides for developing and fixing images on the films at a single operation through the employment of a combined developing and fixing solution as an immersion bath.

By the outlined methods of dye sensitizing and of reducing and fixing the color in a single operation and thereafter combining the films, the faults resulting from so called "bleeding" of dyes are eliminated, the transfusion of dye from one element to another becomes harmless, they being directly in register so that the picture as a whole shows the desired colors.

Thereafter the printed films may be placed temporarily and while in a wet state on top of each other in trial registration using a white background, enabling them to be judged for proper density and the quality of the finished print.

Figures 27, 28:
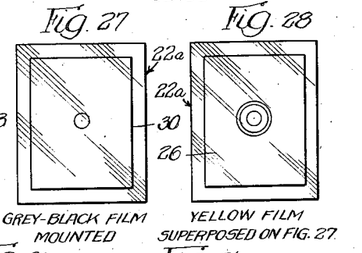
Figure 27 is a face view of the gray-black film ready for reception of a color film to be superimposed.
Figure 28 is a corresponding face view of a gray-black print with a color film superimposed, the circles representing the colors conventionally.

The subsequent steps in producing the complete picture are illustrated in Figures 27–31. The black paper print with its associate parts, herein designated as 22a, is first momentarily immersed in water and then evenly covered with adhesive cement indicated by the numeral 29 (Figure 27). The yellow print of film 26 is superimposed thereon while brought into correct registration therewith. It is fixed in place by pressing down as with a rubber squeegee, eliminating superfluous moisture and cement. Thereafter it is checked for minute details of registration, slight errors being corrected by pushing the film into place, its density rendering it pliable and facilitating correct registration (Figure 28).

Figure 29:
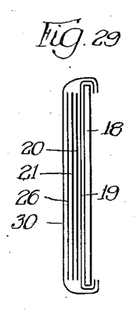
Figure 29 is a side view of Figure 28 with a Cellophane covering applied.
Figures 30, 30A:
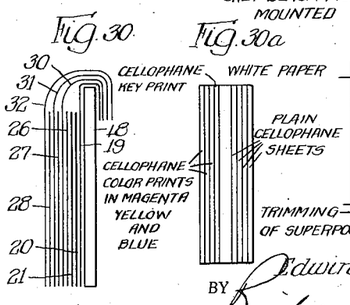

Next the yellow film 26 is covered with adhesive and a thin sheet of plain, wet, uncolored Cellophane 30 placed over it and squeegeed down into place (Figure 29). The function of the Cellophane sheet 30 is to protect the yellow film against displacement and also from losing color, but it is to be understood that the addition of the sheet 30 is optional although preferred by me. The build-up illustrated in Figure 29 is next dried in a heavy air current, this operation taking only six or eight minutes, and putting it in condition for the application of the red film 23 by substantially the identical process above outlined. After drying, the combination or build-up is ready for the blue film 27, thus completing the final picture (Figures 30 and 31). Cellophane sheets 31 and 32 corresponding to 30 are applied in the same way, to the red and blue films. If deficient in any color, an additional film of the necessary color reduced to proper density may be applied. When the whole combination, as illustrated in Figures 30 and 31, is thoroughly dried, it should be removed from its rigid support plate 18 by cutting around the edges through all overlapping films and the heavy Cellophane 19 used as a backing. The composite picture readily peels off the supporting plate 18 and the result is a finished glossy print in full natural color. It should be placed under flat pressure for awhile to counteract any tendency toward curling and is then ready for mounting or framing. It will of course be understood that the order in which the various color films are applied in the build-up is optional and a matter of preference or convenience. Whatever the order, the color values are not altered or affected.

The modified arrangement shown in Figure 30A is especially desirable. In this arrangement the image-bearing thin Cellophane sheets, bearing images in yellow, magenta, blue and brown adhere closely to each other without any intervening support such as Celluloid, and are built up on one side of a sheet of plain white paper. On the reverse side of this plain white paper are a corresponding number of thin Cellophane sheets to balance the image-bearing sheets on the front of the paper.

The invention has heretofore been described in connection with a standard four-color process but it is to be understood that its principles may be made use of in other processes. For example, simple tri-color photography may be accomplished by using a plain sheet of unsensitized, gelatinized, glossy photographic backing paper fixed to the heavy Cellophane backing as in Figure 7. No black-gray print being required, this plain white sheet is simply used as a foundation for the yellow, red and blue films which are built up successively as in the four-color process.

Moreover, sets of three-color separation negatives may be printed in four colors, giving a much richer effect, proceeding as in the four-color process but without use of the black printing negative. In such case the blue printing negative is used in making the black print which should be on soft, instead of contrast, paper in order to make the print less black and more gray.

Figure 32:
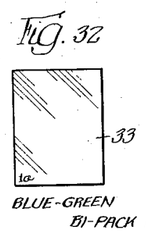
Figures 32 and 33 illustrate color-separation negatives made with "bi-pack" photographic film.
Figure 33:
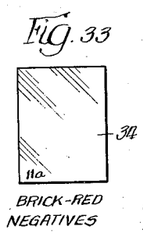
Figure 34:
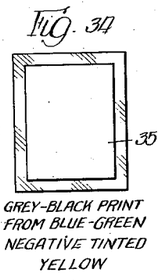
Figures 34 through 36 illustrates prints or films produced by the "bi-pack" process.
Figure 35:
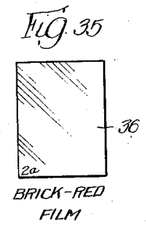
Figure 36:
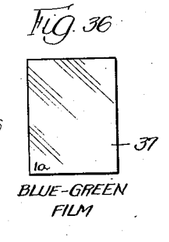

For another example of the applicability of the principles of the invention, I will describe the method of making pseudo-color-separation negatives by what is sometimes termed "bi-pack" by means of a single photographic exposure. A "bi-pack" (not illustrated) consists of two separate photographic negatives, placed one on top of the other in the plate-holder of an ordinary camera. The first negative of the series may be an ordinary orthochromatic film. This should preferably be placed emulsion-side inward. Separating this negative from its mate in the printing frame should be some filter or arrangement of dye in lieu thereof, providing a filtration of light which reaches the second negative, which should be of a supersensitive panchromatic type. This filtration should be of an orange-red hue, making the second negative into what might be termed a "blue-green printing negative," if it were to be used in a strictly two-color process in the making of transparencies or lantern slides on ordinary photographic gelatine shorts, this being a well known method in color photography. The front negative, therefore, of an ordinary "bi-pack" series may be termed the "brick-red printer" and the back negative element, after filtration, being called the "blue-green printing negative" or, for brevity, the "blue-green negative." While these are certainly not truly correct color-separation negatives, they give an artificial separation which by this process of treatment may be converted into a pleasing paper print, superior in value to the two-color transparency which they are intended to produce, in prior methods. This process is illustrated in Figures 32–36. Figure 32 illustrates blue-green negative 1a designated by the numeral 33, and Figure 33 the brick-red negative 11a designated by the numeral 34. To obtain the best results these are employed as follows.

Figure 8:
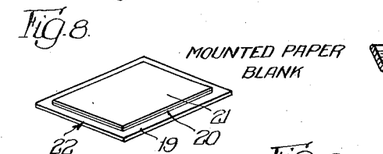

The negative 33 is used to make the black paper print 35 (Figure 34) which may be suitably mounted or backed in a manner shown in Figure 8. While this print 35 is still wet and on its mount it is immersed for a few minutes in a weak aqueous solution of yellow dye to give it a light yellow coloration. The brick-red film 2a designated as 36 (Figure 35) is then printed from the negative 34 and this film 36 superimposed on the print 35. Thereafter another print 37 (Figure 36) is made from the negative 33, this print being superimposed on the combined film 36 and print 35. The resultant picture has much more color value than could be obtained from ordinary "bi-pack" negatives, and approximates the effect of full color printing.

Figures 37, 38:
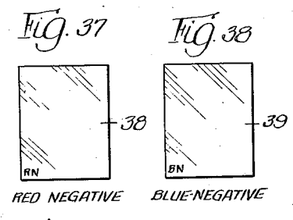
Figures 37 and 38 show negatives used in two-color printing.
Figure 39:
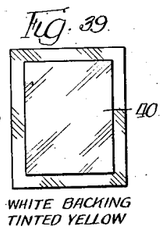
Figures 39, 40 and 41 are illustrative of the processes involving color printing with red and blue films on a white backing with yellow tint.
Figure 40:
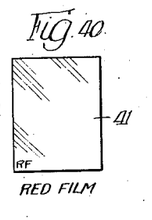
Figure 41:
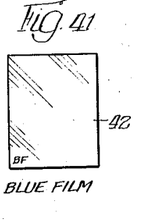

In two-color printing, red and blue negatives may be employed, these being designated respectively as 37, 38 and 39 (Figures 37 and 38). Figure 39 illustrates a white backing 40 suitably mounted and tinted a weak yellow. Figure 40 illustrates a red film 41 printed from negative 38 and Figure 41 illustrates a blue film 42 printed from negative 39 such printings being made in the general manner described in detail in connection with the four-color process. The films 41 and 42 are successively superimposed on the element 40, the result of this two-color process giving richer tones than heretofore possible and being applicable in rotogravure printing for magazines where the expense of three- or four-color work is prohibitive.

In another method of two-color printing, either from bi-pack made negatives, or from the red and blue printing negatives of three- or four-color processes, the following method is successful. In this method, Figure 39 illustrates a white backing suitably mounted. Figure 40 now illustrates an orange-dyed film 41 printed from negative 38 and Figure 41 illustrates a blue (or blue-green) film 42 printed from negative 39, such printings being made in the general manner described in detail in connection with the four-color process. The films 40 and 41 are successively superimposed on the element 40, the result of this two-color process being the production of paper prints combining excellent flesh texture and tones, being specially adaptable to rotogravure printing where the use of white paper is obligatory, and in which the effect of natural color is desired at relatively small expense. In this method the so-called "orange film" or print may be varied from orange to a decided orange-red or flesh-pink, and the blue film may be varied, by dye-combining, from deep blue to any desired tone of blue-green or even green itself.

In the method of two-color printing described herein reference has been made to bi-pack negatives. Even better results are to be obtained by absolutely correct color-separation negatives, where the filters are adjusted to get a maximum of color separation efficiency for two colors only. In a camera of my invention not disclosed herein, the making of two definite separation negatives, properly marked for identification is readily accomplished. The superiority of such negatives to ordinary bi-pack is obvious.

The greatest difficulty in bi-pack photography has been in the lack of registration, that is, the fact that two elements of the bi-pack were not in complete and proper contact throughout the area to be exposed in the camera.

Figure 45:
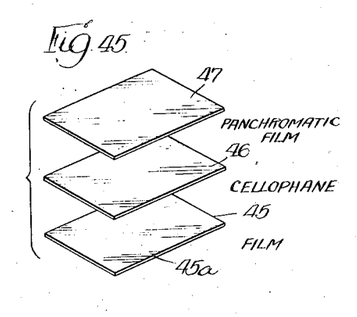
Figures 45 and 46 are illustrative of the so-called "bi-pack" feature.

Figure 45 is an exploded view showing the elements composing the improved bi-pack arrangement which I have invented as part of this process. Numeral 45 represents a piece of film, this having a very thin, practically transparent, base and relatively transparent photographic emulsion, its photographing quality being orthochromatic, contrastive and therefore, extremely sensitive for printing in red. The back, or non-emulsion side of this film, designated as 45a, is placed downward. The element 46 is a sheet of Cellophane, or equally transparent very thin material, properly dyed for filtration qualities desired (e. g. red), and cemented around the edges to 45, assuring the contact of the element 47, a correspondingly cut panchromatic film of high speed, which in turn is cemented around the edges, and placed on top of 46, care being taken that the edges of all three elements 45, 46 and 47 are in exact register.

By another method these three elements can be joined in factory manufacture, so that 45, 46 and 47 become one piece, and so handled in loading of photographic film holders, properly designated by notches so that the correct side for proper filtration would be easily identified in the dark. This would give the added advantage of complete surface contact for the three elements at all times, this being accomplished by the use of an all-over adhesive which would readily dissolve in water at a temperature not exceeding 60° F., the color utilized in the dyeing of the Cellophane filter element 46 being such that it would wash out in ordinary water without imparting any stain to elements 45 and 47.

Figure 46:
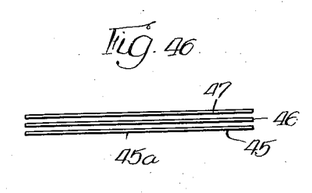

The method for developing this combination varies from usual photographic practice only in the prior immersion of the exposed film combination of 45, 46 and 47, designated as a whole by Figure 46, in plain water, until such time as the elements separate, the Cellophane filter 46 being discarded, while the red-printing negative 45, now a unit, and the blue-printing negative 47, now also a separate unit, are developed, washed, fixed and dried in the usual manner. The negatives so produced are printed identically as described for other pi-pack arrangements.

Figure 42:
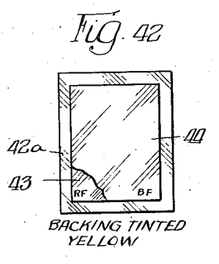
Figures 42, 43 and 44 are illustrative of the elements used in connection with printer-proofs for color matching purposes.
Figure 43:
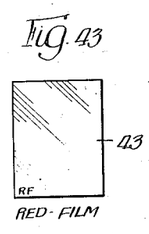
Figure 44:
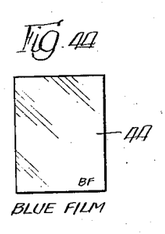

Magazine printing or other press work where, in accordance with the foregoing, only two press impressions are required for the printing of pictures in an approximation of natural color, is rendered practical only with progressive printers' color guides which are another feature of the present invention illustrated graphically in Figures 42–44. Such guides are necessary in order to supply proofs to the printer for the purpose of color-matching with the printed product. First a backing 42 is prepared in the usual manner with gelatinized but non-sensitized paper, this being dyed to a weak yellow of even tone. Upon this backing 42 as a basis a red film print 43 is made from a red negative, as 12 (Figure 3), and a blue film 44 is made from a blue negative as 13 (Figure 4), this being superimposed. The tone of red used may be either magenta or true red, or a lighter red, especially mixed for the purpose which must be duplicated by the printer to obtain the same effect. The blue may also be varied towards a brighter or more greenish blue tone than the true blue used in the regular four-color process work. With this aid progressive proofs showing the uncombined and combined colors in proper printing rotation are provided showing the shades that must be matched.

This invention has a variable aspect, which permits of an alternate method of print-making using the same elements and procedure but producing a print which while containing all the color is yet predominated by the black toned print (the other colors as added being more of a tinting than as actuality) that is, the black photograph remains the feature.

To produce this effect the black print is made definitely black and white, rather than gray, as is usual in the full color prints. The process is carried through in identical manner up to and including the superimposition of the yellow print. This yellow print is made somewhat stronger in tone than the usual print for superimposition. Instead of letting yellow film remain permanently affixed to the black print by means of adhesive, it is brought into contact with the black print, squeegeed down, and allowed to remain in place for only about five minutes or more or less, as required to transfer most of the dye in the Cellophane to the black print. Then, after the yellow printed Cellophane has been taken away, a plain piece of moisture-resisting Cellophane is placed over the black print (now colored with yellow), this plain Cellophane covering all of the print but not one of the borders between the print and the edge of the rigid support. The red printed Cellophane is then superimposed into trial registration over this protective Cellophane. When registered, the sheet of moisture-resisting Cellophane is gently pulled from under the red film which then drops into its proper registration place. This in turn is corrected for slight errors, then squeegeed into place where it is allowed to remain until its load of dye is absorbed into the paper when it is removed. The blue may be similarly applied or a very thin blue print superimposed and cemented permanently into place, acting as a protection to the two colors already absorbed into the gelatinized surface of the black print.

This method of coloring or tinting may be applied to an ordinary black and white photograph by preparing a backing, making the black print in the usual manner and then from the same negative making a film print of flesh color, composed of magenta and yellow dye mixed, in the sensitizing solution. This is superimposed and allowed to remain for about five minutes when it is removed. The black print will have taken on a flesh tone. Now, if desired, retouch out the lips on the negative and hold back any other desired portion when making a light blue print, which is superimposed, completing the picture. By this method valuable color effects may be obtained from ordinary black and white negatives.

By the invention transparencencies of various sizes for advertising and display purposes may readily be made in the following manner. From the black printing negative a positive print is made upon the sensitized photographic glass as a base and upon this are superimposed and fixed by means of cement Cellophane transparencies from the blue, yellow and red negatives, these being joined in a solid mass. Or in the alternative, a backing consisting of very heavy Cellophane may be stretched over a rigid transparent temporary support and upon this are superimposed films in two or more colors. Another sheet of Cellophane may be placed over the top and when dried the whole combination is removed. This may be then cemented between sheets of transparent fireproof material and is then ready for projection.

A highly important use of the invention is in connection with natural color printing for motion picture film. In such use color-separation motion picture negatives in various combinations of color may be employed in accordance with the principles of the invention. The practical application of the novel processes of the invention are varied to take account of the small negatives and prints in this field, together with the mechanization of registration or imposition of colors one upon another made possible through the use of sprocket holes of the usual type in the motion picture films.

Upon a Celluloid or kindred base suitable for motion picture perforation a combination of liquefied cellulose or approximate equivalent to Cellophane in liquid form, to which acid dye and bichromate sensitizer have been added, is mechanically applied in a continuous strip to motion picture film, which has already been printed with a black print, or an iron-toned blue print. Printing operations for the one color of the dye sensitizer are carried out as heretofore outlined. Then another coat of dye sensitizer combined with the equivalent of liquid Cellophane in another color is added, this being carried out as many times as desired for the succession of colors required.

This sensitized dye material may be applied over the whole film or so regulated as to leave bare and uncolored the portion of the film on which the sound track is to run, the sound track being carried by the original positive printing. The sensitizer dye material may be applied over the bare celluloid base of a film holding a recording in black and white, over the emulsion side of the film or on the back thereof.

For three-color picture positive film production from motion picture color-separation negatives, made specifically for printing in blue, red and yellow, the following procedure is followed. From the blue printing negative a positive print in bright true-blue tone is printed, carrying the sound track or not, as most convenient. After this has been printed, fixed and dried, in a new operation in the dark, the equivalent to liquid Cellophane is applied to the film, preferably on the back thereof. With this liquid Cellophane, or desired form of cellulose or kindred substance, is mixed a combination of dye and sensitizer with or without the addition of citric acid, practically as outlined in relation to still pictures in this invention. This combination, in liquid form, is applied as a smooth, even varnish to the film, which is dried in darkness. Let us presume that the material applied includes a red dye. In this case the red printing negative of the color-separation series is brought into contact with printing source of light in correct corresponding pictorial assembly with the motion pictures previously printed in blue color. After printing, this film is run through a solution of acetic or citric acid, fixing and reducing the color to the desired point at one operation. The combination now resulting is a two-color film and might be commercially used as such. The addition of another color, yellow as an example, would follow by an identical application of yellow dyed material in liquid form, comprising a like base of cellulose, sensitizer and yellow dye with or without citric acid, the operations of printing, reducing and fixing to follow. It is also possible to carry out the same operation with the red dye material, printing but not developing, then adding the yellow dye material, printing from the yellow printing negative, and then reducing and fixing the two colors, red and yellow, in one single operation after which the picture is dried as a complete three-color, full toned picture print in natural color.

This sensitizing dye combined with cellulose may also be used in an interrupted manner on motion picture film, that is, instead of a continuous ribbon application it may be applied to alternate frames in whatever combination of color is desired. For example, take a film in which the negative has been made with a rotating filter in front of the camera providing different separations for alternate printing frames in the negative, such as a combination of red printing and green printing frames, or another combination of brick-red and blue-green printing frames, or another combination of red printing, blue printing and yellow printing frames, or other desired combinations of printing colors in relation to color-separation negatives. Then instead of the continuous ribbon printing by mechanical means that red printing would be carried out by the stamping of dye sensitizer combined with cellulose upon one frame, leaving the sound track at the side bare, if desired, in the next frame by similar mechanical means, but in the same operation, blue sensitizer dye cellulose is applied, and to the third frame yellow dye sensitizer cellulose is applied, this combination being mechanically repeated again and again, to correspond to the requirements of the negative which is to be printed therefrom and thus being converted into a natural color positive film.

The three elements so put down can be printed in one operation from a single negative or in one operation from a double printing machine if the printing is from two double negatives, or by multiple operations of printing but can be developed and fixed in one operation no matter what colors or combinations of colors are involved.

Printing of a base print including the sound track in blue iron toning may be made, the additional colors of red and yellow being added alternately to the printing frames.

Various changes that will suggest themselves to those skilled in the art may be made without departing from the spirit and scope of the invention.

The invention is not restricted to the use of any particular type of dye, although dyes capable of dyeing from an acid medium, that is to say, acid dyes, are preferred. The dyes may be identified from Rowe's Color Index, 1924 edition. Typical dyes are Acid Sky Blue (Color Index No. 1088), Acid Magenta (Color Index No. 692) and Phloxine (Color Index No. 774). The preferred method of dyeing and sensitizing, as herein described is claimed in my copending application Serial No. 247,290, filed of even date herewith.

Having thus described the invention, what I claim as new and desire to secure by Letters Patent of the United States is:

1. In the art of color photography, the method of producing a composite color photograph which comprises mounting a plurality of sheets of thin transparent regenerated cellulose material in superposed relationship on a substantially smooth plane-surfaced rigid support with marginal portions of said transparent material overlapping margins of said support and being adhesively secured to each other and to the reverse side of said support, mounting on the outer sheet of said transparent material a sheet of uniform non-transparent light reflective material in adhesive engagement with said outermost transparent sheet, separately preparing a series of single mounted transparent regenerated cellulose sheets by mounting a series of thin water previous wetted and expanded regenerated cellulose sheets on separate plane-surface supports with marginal portions of each of said sheets adhesively secured to the reverse side of each of said supports, sensitizing and coloring each of said single mounted sheets by applying to the surface of each a combined solution of a dye and a sensitizing material, each dye being of a different color value corresponding to an appropriate color separation negative, drying the resultant sensitized blanks, printing on each of said blanks from an appropriate color separation negative, subjecting each blank to a combined developing and fixing operation in a mild acid bath and contemporaneously removing each colored part-image bearing regenerated cellulosic sheet from its respective support, mounting said image bearing sheets in register while still wet in superposed relationship on said light reflective material, drying the composite picture thoroughly, and removing the support from the resultant composite picture.

2. A method as claimed in claim 1 in which the number of sheets of transparent material on one side of the light reflective material corresponds to the number of sheets of transparent and image bearing sheets on the opposite side.

3. A method as claimed in claim 1 in which the image bearing sheets are mounted in register and separated from each other by non-image bearing transparent sheets.

4. A method as claimed in claim 1 in which the combined solution of dye and sensitizer are applied to the mounted regenerated cellulose sheets in the presence of an acid.

5. A method as claimed in claim 1 in which the same sensitizing material is used for sensitizing each regenerated cellulose sheet regardless of whether the dyes are different.

6. A method as claimed in claim 1 in which the light reflective material is a white unsensitized paper.

7. A method as claimed in claim 1 in which the light reflective material is a sensitized paper bearing a key print image of the object in one of the colors black and brown.

8. A method as claimed in claim 1 in which the light reflective material is colored yellow and only two colored image bearing sheets are superposed thereon bearing images colored in shades of orange to red and blue to green, respectively.

9. A method of photographic color printing which comprises the steps of preparing a plurality of color separation negatives of differing color selectivities, preparing a plurality of substantially transparent non-moistureproof regenerated cellulose films suitably stretched, applying to the surfaces thereof solutions of acid azo dyes corresponding to the positive printing color of the color separation negatives, each of said solutions containing a soluble bichromate sensitizing material, arranging the sensitized regenerated cellulose sheets in proper relationship for printing with their associate color separation negatives, then exposing to light so as to print from the negatives on the prepared surfaces of said films, removing the regenerated cellulose films and immersing them in a dilute acid solution adapted to simultaneously develop and fix the image and dye in each sheet, and finally superimposing said sheets one upon another.

10. In the art of color photography, the steps which comprise applying to a regenerated cellulose film an aqueous solution of an acid aniline azo dye and a bichromate sensitizing material to produce a sensitized regenerated cellulose film containing a dye, printing an image thereon from a complemental color separation negative and then applying thereto a combined reducing and fixing bath comprising a dilute acid solution adapted to simultaneously develop the image and fix the dye.

11. In the art of color photography, the steps which comprise simultaneously sensitizing and dyeing a regenerated cellulose sheet with a solution of an acid aniline azo dye and a bichromate sensitizing material, printing an image thereon from a color separation negative and then applying thereto a combined developing and fixing bath comprising dilute acetic acid whereby the image and dye are permanently developed and fixed at a single operation.

12. In the art of color photography, the steps which comprise simultaneously sensitizing and dyeing a regenerated cellulose sheet with a solution of an acid aniline azo dye and a bichromate sensitizing material, printing an image thereon from a color separation negative and then applying thereto a combined developing and fixing bath comprising dilute citric acid whereby the image and dye are permanently developed and fixed at a single operation.

13. In the art of color photography, the step which comprises wetting and expanding a regenerated cellulose sheet material and applying to the wet and expanded sheet a solution of an acid aniline azo dye and a bichromate sensitizing material.

14. In the art of color photography, the step which comprises applying to a regenerated cellulose sheet material an aqueous solution of an intimate mixture of an acid aniline azo dye and a bichromate sensitizing material.

15. In the art of color photography, the step which comprises sensitizing and dyeing a regenerated cellulosic sheet material by applying thereto a solution of a mild acid, an acid dye and a dichromate sensitizing material, the relative proportions of said materials by weight corresponding to about 2 to 10 parts of acid, about 10 to 60 parts of dye and about 5 to 60 parts of dichromate.

16. In the art of color photography, the steps which comprise simultaneously sensitizing and dyeing a regenerated cellulosic sheet material by applying thereto a solution of an acid dye and a water-soluble chromate sensitizing material in the presence of an acid, drying, printing an image thereon from a complemental color separation negative, and then applying thereto a combined reducing and fixing bath comprising a dilute acid solution adapted to simultaneously fix the dye and develop the image.

17. In the art of color photography, the steps which comprise wetting and expanding a regenerated cellulosic sheet material, and applying to the wet and expanded sheet a solution of a soluble chromate sensitizing material and an acid dye.

18. In the art of color photography, the step which comprises sensitizing and dyeing a regenerated cellulosic sheet material by simultaneously applying thereto a soluble chromate sensitizing material and an acid dye, said chromate and said dye being applied in solution.

EDWIN BOWER HESSER.

CERTIFICATE OF CORRECTION.

Patent No. 2,241,402.   May 13, 1941.

EDWIN BOWER HESSER.

It is hereby certified that error appears in the printed specification of the above numbered patent requiring correction as follows: Page 2, first column, line 20, for "Figure 20" read --Figure 30--; and second column, line 13, after "19a" insert --which--; page 6, first column, lines 6 and 7, for "negatime" read --negative--; page 8, first column, line 41, claim 1, for "previous" read --pervious--; and that the said Letters Patent should be read with this correction therein that the same may conform to the record of the case in the Patent Office.

Signed and sealed this 17th day of June, A. D. 1941.

(Seal)

Henry Van Arsdale,
Acting Commissioner of Patents.